(12) United States Patent
Han

(10) Patent No.: US 10,648,824 B2
(45) Date of Patent: May 12, 2020

(54) ELECTRONIC DEVICE AND METHOD FOR PROVIDING MOVEMENT PATH

(71) Applicant: Samsung Electronics Co., Ltd., Gyeonggi-do (KR)

(72) Inventor: Jonghyun Han, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 140 days.

(21) Appl. No.: 15/914,030

(22) Filed: Mar. 7, 2018

(65) Prior Publication Data

US 2018/0259352 A1    Sep. 13, 2018

(30) Foreign Application Priority Data

Mar. 9, 2017    (KR) .................. 10-2017-0030159

(51) Int. Cl.
| | |
|---|---|
| *G01C 21/26* | (2006.01) |
| *G01C 21/32* | (2006.01) |
| *G01C 21/34* | (2006.01) |
| *G06F 16/29* | (2019.01) |
| *G08G 1/00* | (2006.01) |
| *G01C 21/20* | (2006.01) |

(Continued)

(52) U.S. Cl.
CPC ......... *G01C 21/3446* (2013.01); *G01C 21/20* (2013.01); *G01C 21/32* (2013.01); *G01C 21/3438* (2013.01); *G06F 16/29* (2019.01); *G08G 1/0969* (2013.01); *G08G 1/096805* (2013.01); *G08G 1/096811* (2013.01)

(58) Field of Classification Search
CPC . G01C 21/00; G08G 1/00; G08G 1/16; G06F 16/00
See application file for complete search history.

(56) References Cited

U.S. PATENT DOCUMENTS

2012/0030133 A1 * 2/2012 Rademaker ............ G06Q 10/08
705/333
2014/0136107 A1    5/2014 Pfeifle
(Continued)

FOREIGN PATENT DOCUMENTS

| KR | 10-1241610 B1 | 3/2013 |
|---|---|---|
| KR | 1020160050151 A | 5/2016 |

*Primary Examiner* — Yonel Beaulieu
(74) *Attorney, Agent, or Firm* — Cha & Reiter, LLC

(57) ABSTRACT

A method and electronic device for requesting and providing a navigable movement path are provided herein. An electronic device for providing the movement path and meeting location are provided as well. The electronic device for requesting the navigable movement path includes a communication module, a display and a processor. The processor may implement the method including: when a preset condition is satisfied, transmit a request for movement path information and movement information of the electronic device through the communication module to the external device, the movement path information navigable to a meeting location with a second electronic device, receive a transmission of information from the external device, the received information including the meeting location designated based on the movement information of the electronic device, and a movement path navigable to the meeting location, and display the movement path navigable to the meeting location on the display.

16 Claims, 13 Drawing Sheets

(51) Int. Cl.
*G08G 1/0969* (2006.01)
*G08G 1/0968* (2006.01)

(56) References Cited

U.S. PATENT DOCUMENTS

| | | | |
|---|---|---|---|
| 2014/0207375 A1* | 7/2014 | Lerenc | G01C 21/3438 |
| | | | 701/527 |
| 2015/0317568 A1* | 11/2015 | Grasso | G06Q 10/1093 |
| | | | 705/5 |
| 2016/0138928 A1* | 5/2016 | Guo | G06F 16/29 |
| | | | 701/537 |
| 2016/0156773 A1* | 6/2016 | Chanda | H04M 1/72522 |
| | | | 455/414.1 |
| 2016/0364679 A1* | 12/2016 | Cao | G06Q 10/083 |
| 2017/0213403 A1* | 7/2017 | Diehl | G07C 9/00007 |
| 2018/0189717 A1* | 7/2018 | Cao | G06Q 50/30 |
| 2018/0196415 A1* | 7/2018 | Iagnemma | G08G 1/005 |
| 2018/0211186 A1* | 7/2018 | Rakah | G08G 1/096844 |
| 2018/0288568 A1* | 10/2018 | Pao | H04W 4/023 |
| 2019/0066250 A1* | 2/2019 | Levy | G01C 21/3438 |

\* cited by examiner

ELECTRONIC DEVICE AND METHOD FOR PROVIDING MOVEMENT PATH

CROSS-REFERENCE TO RELATED APPLICATION(S)

This application is based on and claims priority under 35 U.S.C. § 119 to Korean Patent Application No. 10-2017-0030159, filed on Mar. 9, 2017, in the Korean Intellectual Property Office, the disclosure of which is incorporated by reference herein in its entirety.

TECHNICAL FIELD

Various embodiments of the present disclosure relate to a method presenting a beneficial meeting place for multiple users in different locations to meet together, and provide movement paths from each user's location to the meeting place, and to an electronic device supporting the method.

BACKGROUND

Electronic devices can perform a variety of composite functions. For example, mobile communication terminals, personal digital assistants (PDAs), electronic organizers, smartphones, and tablet personal computers have been developed to provide users with more convenience while realizing improved performance. Such an electronic device may acquire position information thereof using GPS information received from GPS satellites, and may use the acquired position information and the position of a specific destination to provide map information corresponding to the destination position.

An electronic device may provide a recommended travel path from the current location thereof to the destination to be reached. However, in a situation where the users of two electronic devices want to move to meet each other at a particular place, when one electronic device is being moved, the other electronic device can also be moved to another position. The existing path finding method based on the pre-determined destination may fail to provide efficient movement paths for the users trying to meet each other at a specific place.

SUMMARY

Aspects of the present disclosure are to address at least the above mentioned problems and/or disadvantages and to provide at least the advantages described below. Accordingly, an aspect of the present disclosure is to provide a method that can propose a suitable meeting place for multiple users in different locations trying to meet together and present a movement path from each user's location to the meeting place.

In accordance with an aspect of the present disclosure, an electronic device is provided. The electronic device may include: a communication module to communicate with an external device, a display to display a user interface, and a processor, configured to: when a preset condition is satisfied, transmit a request for movement path information and movement information of the electronic device through the communication module to the external device, the movement path information navigable to a meeting location with a second electronic device, receive a transmission of information from the external device, the received information including the meeting location designated based on the movement information of the electronic device, and a movement path navigable to the meeting location, and display the movement path navigable to the meeting location on the display.

In accordance with another aspect of the present disclosure, an electronic device capable of providing a movement path apparatus is provided. The electronic device may include: a communication module to communicate with a first electronic device and a second electronic device; a database; and a processor. The processor may be configured to: receive a request for movement path information from at least one of the first and second electronic devices, and movement information through the communication module transmitted by at least one of the first electronic device and the second electronic device, extract at least one path layer for the first and second electronic devices from the database based on the movement information, receive external variable information through the communication module from an external server, determine a meeting location and two movement paths navigable by the first and second electronic devices respectively to arrive at the meeting location, on the basis of the path layers of the first and second electronic devices and the external variable information, and transmit the two movement paths through the communication module to the first electronic device and the second electronic device, respectively.

In accordance with an aspect of this disclosure a method for providing a movement path in an electronic device is disclosed, including: receiving a request for movement path information from at least one a first electronic device and a second electronic device, receiving movement information from the first electronic device and the second electronic device, extracting path layers of the first and second electronic devices based on the movement information, receiving external variable information from an external server, determining a meeting location and two movement paths navigable to the meeting location on the basis of the path layers and the external variable information, and transmitting the two movement paths to the first electronic device and the second electronic device respectively.

In a feature of the present disclosure, it is possible to provide users of different electronic devices with movement paths that allow the users to meet at a particular location in consideration of the means of transportation of the users.

In another feature of the present disclosure, the electronic device may analyze user information. If a preset condition is met, the electronic device may automatically invoke a vehicle and provide a movement path and map information. Thereby, user convenience can be improved.

DETAILED DESCRIPTION

Figure 1:
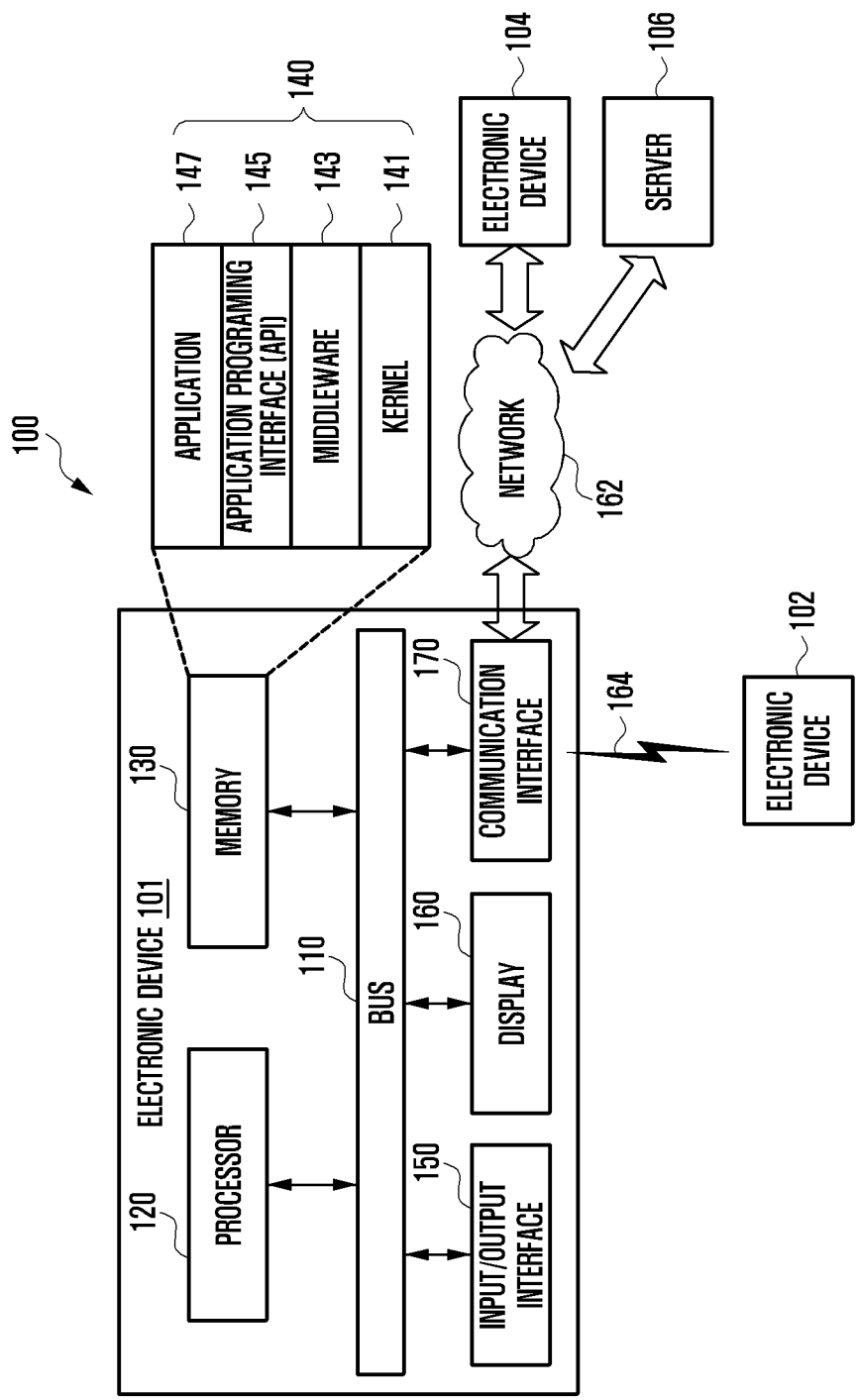
FIG. 1 illustrates a network environment including electronic devices according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the various embodiments described herein can be made without departing from the present disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly indicates otherwise. Thus, for example, reference to "a component surface" includes reference to one or more of such surfaces.

In this disclosure, the expression "A or B" or "at least one of A and/or B" may include A, may include B, or may include both A and B. Expressions including ordinal numbers, such as "first" and "second," etc., may use various elements without limiting the components. However, the above expressions do not limit the sequence and/or importance of the elements and are used merely for the purpose to distinguish an element from the other elements. In case where a certain (e.g., the first) element is referred to as being "connected" or "accessed" (functionally or communicatively) to other (e.g., the second) element, it should be understood that the element is connected or accessed directly to the other element or through another (e.g., the third) element. In this disclosure, the expression "configured to" may be used, depending on situations, interchangeably with "adapted to", "having the ability to", "modified to", "made to", "capable of", or "designed to". In some situations, the expression "device configured to" may mean that the device may operate with other device(s) or other component(s). For example, the expression "processor configured to perform A, B and C" may mean a dedicated processor (e.g., an embedded processor) for performing the above operations, or a general-purpose processor (e.g., central processing unit (CPU) or an application processor (AP)) capable of performing the above operations by executing one or more software programs stored in a memory device. An electronic device according to various embodiments of this disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a medical device, a camera, and a wearable device. For example, a wearable device may include at least one of an accessory type (e.g., a watch, a ring, a bracelet, an anklet, a necklace, an electronic accessory, eyeglasses, contact lenses, or a head-mounted device (HMD)), a textile or cloth assembled type (e.g., electronic clothing), a body attached type (e.g., a skin pad or tattoo), and a body transplant circuit. In some embodiments, an electronic device may include at least one of a television (TV), a digital versatile disc (DVD) player, an audio device, a refrigerator, an air-conditioner, a vacuum cleaner, an oven, a microwave, a washing machine, an air cleaner, a set-top box, a home automation control panel, a security control panel, a media box (e.g., Samsung HomeSync™ Apple TV™, or Google TV™), a game console (e.g., Xbox™, PlayStation™) an electronic dictionary, an electronic key, a camcorder, and an electronic frame.

In various embodiments of the present disclosure, an electronic device may include at least one of various medical devices (e.g., magnetic resonance angiography (MRA), magnetic resonance imaging (MRI), computed tomography (CT), a scanning machine, an ultrasonic wave device, etc.), a navigation device, a global navigation satellite system (GNSS), an event data recorder (EDR), a flight data recorder (FDR), a vehicle infotainment device, an electronic equipment for a ship (e.g., navigation equipment for a ship, gyrocompass, etc.), avionics, a security device, a head unit or device for a vehicle, an industrial or home robot, a drone, an automated teller machine (ATM), a point of sales (POS), and various Internet of things (IoT) devices (e.g., a lamp, various sensors, a sprinkler, a fire alarm, a thermostat, a street light, a toaster, athletic equipment, a hot water tank, a heater, a boiler, etc.). According to a certain embodiment, an electronic device may include at least one of furniture, a portion of a building/structure or car, an electronic board, an electronic signature receiving device, a projector, and various measuring meters (e.g., a water meter, an electric meter, a gas meter, a wave meter, etc.). In various embodiments, an electronic device may be flexible or a combination of two or more of the aforementioned devices. An electronic device according to various embodiments of this disclosure is not limited to the aforementioned devices. In this disclosure, the term a user may refer to a person who uses an electronic device, or a machine (e.g., an artificial intelligence device) which uses an electronic device.

FIG. 1 is a block diagram illustrating a network environment 100 including therein an electronic device 101 in accordance with various embodiments of the present disclosure.

Referring to FIG. 1, the electronic device 101 may include, but is not limited to, a bus 110, a processor 120, a memory 130, an input/output interface 150, a display 160, and a communication interface 170. The bus 110 may be a circuit designed for connecting the above-discussed elements and communicating data (e.g., a control message) between such elements. The processor 120 may receive one or more instructions (e.g., commands or codes executable by an interpreter) from the other elements (e.g., the memory 130, the input/output interface 150, the display 160, or the communication interface 170, etc.) through the bus 110, interpret the received commands, and perform the arithmetic or data processing based on the interpreted commands. The memory 130 may store therein commands or data received from or created at the processor 120 or other elements (e.g., the input/output interface 150, the display 160, or the communication interface 170, etc.). The memory 130 may include programming modules 140 such as a kernel 141, a middleware 143, an application programming interface (API) 145, and an application 147. Each of the programming modules may be implemented by software, firmware, hardware, and any combination thereof.

The kernel 141, as illustrated in FIG. 1, may control or manage system resources (e.g., the bus 110, the processor 120, the memory 130, etc.) used to execute operations or functions implemented by other programming modules (e.g., the middleware 143, the API 145, and the application 147). Also, the kernel 141 may provide an interface capable of accessing and controlling or managing the individual elements of the electronic device 101 by using the middleware 143, the API 145, or the application 147.

The middleware 143 may serve to go between the API 145 or the application 147 and the kernel 141 in such a manner that the API 145 or the application 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 101 can be used, to at least one of the one or more applications 147. The API 145 is an interface through which the application 147 is capable of controlling a function provided by the kernel 141 or the middleware 143, and may include, for example, at least one interface or function for file control, window control, image processing, character control, or the like. The input/output interface 150 may deliver commands or data, entered by a user through an input/output unit or device (e.g., a sensor, a keyboard, or a touch screen), to the processor 120, the memory 130, or the communication interface 170 via the bus 110.

The display module 160 may include, for example, a liquid crystal display (LCD), a light emitting diode (LED) display, an organic LED (OLED) display, a micro electro mechanical system (MEMS) display, or an electronic paper display. The display 160 may display various types of contents (e.g., text, images, videos, icons, or symbols) for users. The display module 160 may include a touch screen, and may receive, for example, a touch, gesture, proximity, or hovering input by using an electronic device or a part of the user's body.

The communication interface 170 may establish communication between the electronic device 101 and any external device (e.g., the first external electronic device 102, the second external electronic device 104, or the server 106). For example, the communication interface 170 may be connected with a network 162 through wired or wireless communication 164 and thereby communicate with any external device (e.g., the second external electronic device 104, or the server 106).

Wireless communication may use, as cellular communication protocol, at least one of long-term evolution (LTE), LTE advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication may include, for example, at least one of Wi-Fi, Bluetooth (BT), near field communication (NFC), magnetic secure transmission or near field magnetic data stripe transmission (MST), and GNSS, and the like. The GNSS may include at least one of, for example, a global positioning system (GPS), a global navigation satellite system (GLONASS), a BeiDou navigation satellite system (hereinafter, referred to as "BeiDou"), and Galileo (European global satellite-based navigation system). Hereinafter, the "GPS" may be interchangeably used with the "GNSS" in the present disclosure.

The wired communication may include, but not limited to, at least one of universal serial bus (USB), high definition multimedia interface (HDMI), recommended standard 232 (RS-232), or plain old telephone service (POTS). The network 162 includes, as a telecommunications network at least one of a computer network (e.g., local area network (LAN) or wide area network (WAN)), the internet, and a telephone network. The types of the first and second external electronic devices 102 and 104 may be the same as or different from the type of the electronic device 101. The server 106 may include a group of one or more servers. A portion or all of operations performed in the electronic device 101 may be performed in one or more other electronic devices 102 or 104 or the server 106. In the case where the electronic device 101 performs a certain function or service automatically or in response to a request, the electronic device 101 may request at least a portion of functions related to the function or service from another electronic device 102 or 104 or the server 106 instead of or in addition to performing the function or service for itself. The other electronic device 102 or 104 or the server 106 may perform the requested function or additional function, and may transfer a result of the performance to the electronic device 101. The electronic device 101 may additionally process the received result to provide the requested function or service. To this end, for example, a cloud computing technology, a distributed computing technology, or a client-server computing technology may be used.

Figure 2:
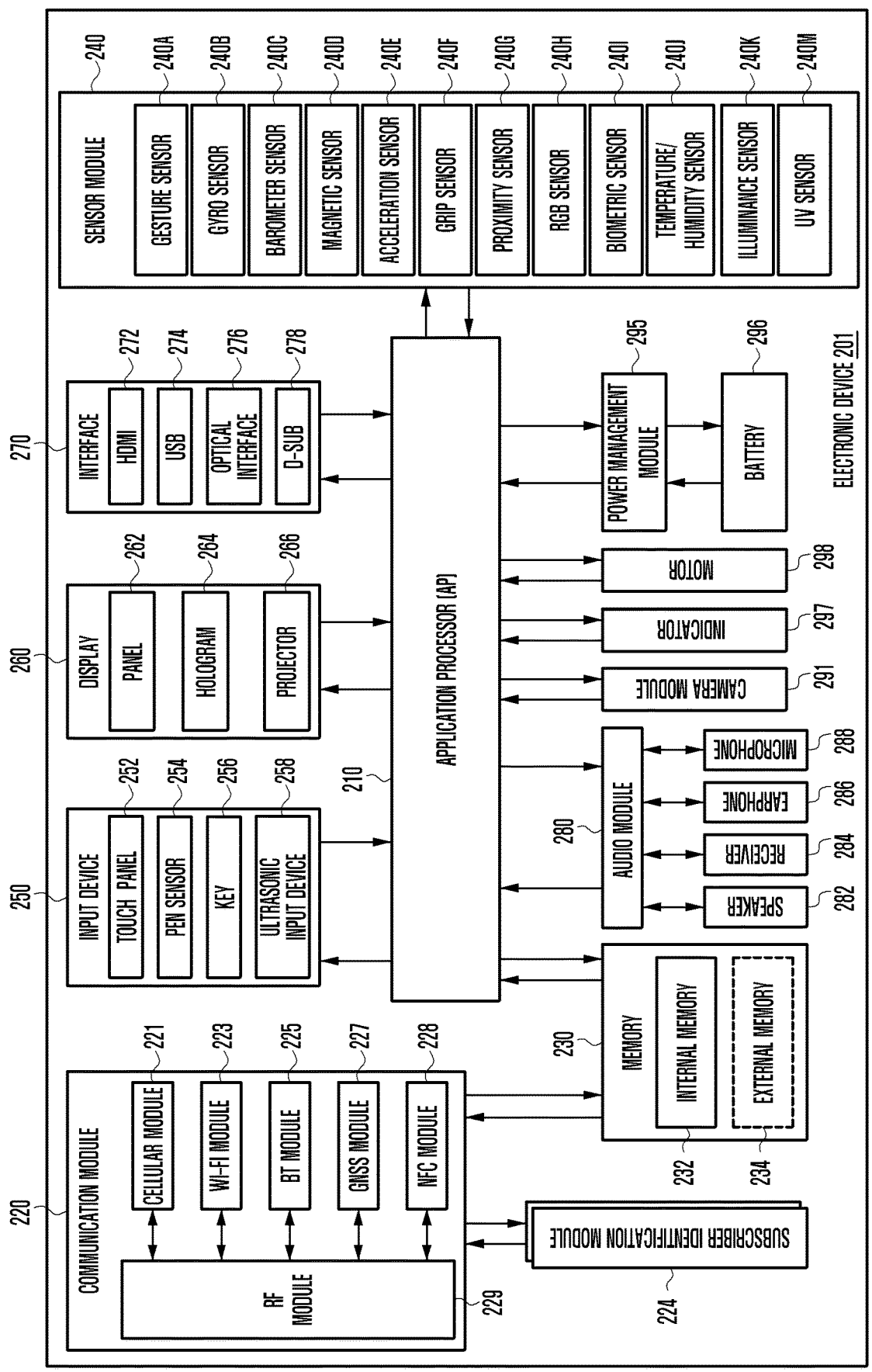
FIG. 2 is a block diagram of an electronic device according to various embodiments of the present disclosure.

FIG. 2 is a block diagram illustrating an electronic device 201 according to various embodiments of the present disclosure. The electronic device 201 may form, for example, the whole or part of the electronic device 101 shown in FIG. 1.

Referring to FIG. 2, the electronic device 201 may include at least one AP 210, a communication module 220, a subscriber identification module (SIM) card 224, a memory 230, a sensor module 240, an input unit or input device 250, a display or display module 260, an interface 270, an audio module 280, a camera module 291, a power management module 295, a battery 296, an indicator 297, and a motor 298. The processor 210 is capable of driving, for example, an operating system or an application program to control a plurality of hardware or software components connected to the processor 210, processing various data, and performing operations. The processor 210 may be implemented as, for example, a system on chip (SoC). According to an embodiment, the processor 210 may further include a graphics processing unit (GPU) and/or an image signal processor.

The processor 210 may also include at least part of the components shown in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory. The communication module 220 (e.g., the communication interface 170) may perform a data communication with any other electronic device (e.g., the electronic device 104 or the server 106) connected to the electronic device 201 (e.g., the electronic device 101) through the network. According to an embodiment, the communication module 220 may include therein a cellular module 221, a Wi-Fi module 223, a BT module 225, a GNSS or GPS module 227, an NFC module 228, and a radio frequency (RF) module 229. The cellular module 221 is capable of providing a voice call, a video call, a short message service (SMS), an internet service, etc., through a communication network, for example. According to an embodiment, the cellular module 221 is capable of identifying and authenticating an electronic device 201 in a communication network by using a SIM 224 (e.g., a SIM card). According to an embodiment, the cellular module 221 is capable of performing at least part of the functions provided by the processor 210. According to an embodiment, the cellular module 221 is also capable of including a communication processor (CP).

As illustrated in FIG. 2, the Wi-Fi module 223, the BT module 225, the GNSS module 227, and the NFC module 228 are each capable of including a processor for processing data transmitted or received through the corresponding module.

The MST module is capable of including a processor for processing data transmitted or received through the corresponding module. According to various embodiments, at least part of the cellular module 221, Wi-Fi module 223, BT module 225, GNSS module 227, NFC module 228, and MST module (e.g., two or more modules) may be included in one integrated chip (IC) or one IC package. The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to an embodiment, at least one of the cellular module 221, the Wi-Fi module 223, the BT module 225, the GNSS module 227, and the NFC module 228 is capable of transmission/reception of RF signals through a separate RF module. The SIM module 224 is capable of including a card including a SIM and/or an embodied SIM. The SIM module 224 is also capable of containing unique identification information, e.g., integrated circuit card identifier (ICCID), or subscriber information, e.g., international mobile subscriber identity (IMSI).

As illustrated in FIG. 2, memory 230 (e.g., memory 103 shown in FIG. 1) is capable of including a built-in or internal memory 232 and/or an external memory 234. The built-in or internal memory 232 is capable of including at least one of the following: a volatile memory, e.g., a dynamic random access memory (DRAM), a static RAM (SRAM), a synchronous dynamic RAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure or barometer sensor 240C, a magnetic sensor 240D, an acceleration sensor 240E, a grip sensor 240F, a proximity sensor 240G, a color or RGB sensor 240H (e.g., a red, green and blue (RGB) sensor), a biometric sensor 240I, a temperature/humidity sensor 240J, an illuminance sensor 240K, and an ultraviolet (UV) sensor 240M.

Additionally or alternatively, the sensor module 240 is capable of further including on or more of the following sensors or operations (not shown): an electronic nose (E-nose) sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein.

In various embodiments of the present disclosure, the electronic device 201 is capable of including a processor, configured as part of the processor 210 or a separate component, for controlling the sensor module 240. In this case, while the processor 210 is operating in a sleep mode, the processor is capable of controlling the sensor module 240. The input device 250 is capable of including a touch panel 252, a (digital) pen sensor (digital pen or stylus) 254, a key 256, or an ultrasonic input unit or device 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user. The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the input/output interface 150 shown in FIG. 1) is capable of including a panel 262, a hologram unit or device 264, or a projector 266. The panel 262 may include the same or similar configurations as a display implemented as part of the input/output interface 150 shown in FIG. 1. The panel 262 may be implemented to be flexible, transparent, or wearable.

The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266. The interface 270 is capable of including an HDMI 272, a USB 274, an optical interface 276, or a D-subminiature (D-sub) 278. The interface 270 may be included in the communication interface 107 shown in FIG. 1. Additionally or alternatively, the interface 270 is capable of including a mobile high-definition link (MHL) interface, an SD card/MMC interface, or an infrared data association (IrDA) standard interface.

The audio module 280, as illustrated in FIG. 2, is capable of providing bidirectional conversion between a sound and an electronic signal. At least part of the components in the audio module 280 may be included in the input/output interface 150 shown in FIG. 1. The audio module 280 is also capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management IC (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PIMC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Each of the elements described in the present disclosure may be formed with one or more components, and the names of the corresponding elements may vary according to the type of the electronic device. In various embodiments, the electronic device may include at least one of the above described elements described in the present disclosure, and may exclude some of the elements or further include other additional elements. Further, some of the elements of the electronic device according to various embodiments may be coupled to form a single entity while performing the same functions as those of the corresponding elements before the coupling.

Figure 3:
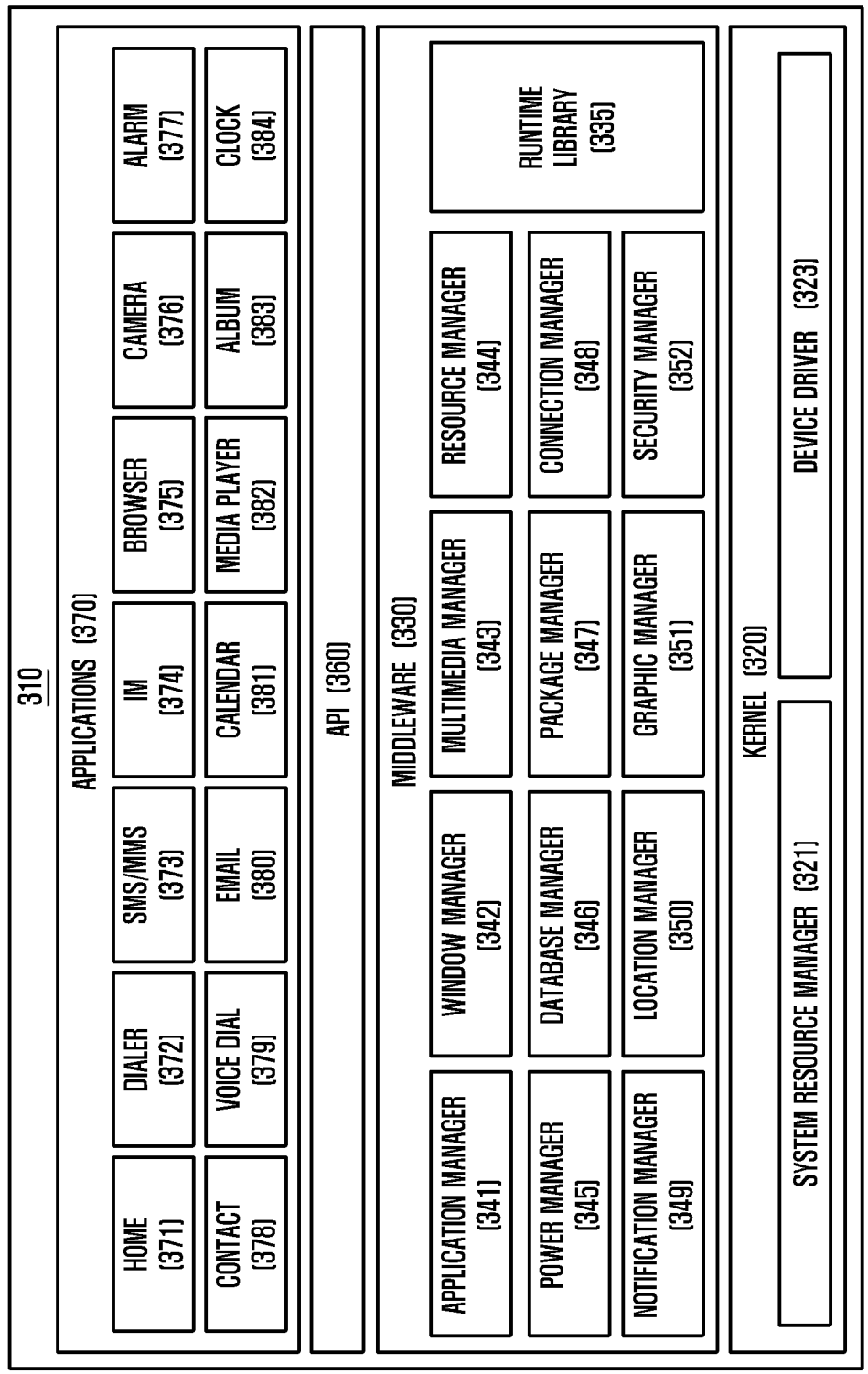
FIG. 3 is a block diagram of program modules according to various embodiments of the present disclosure.

FIG. 3 is a block diagram illustrating a configuration of a programming module 310 according to various embodiments of the present disclosure. The programming module 310 may be included (or stored) in the electronic device 101 (e.g., the memory 130) illustrated in FIG. 1, or may be included (or stored) in the electronic device 201 (e.g., the memory 230) illustrated in FIG. 2. At least a part of the programming module 310 may be implemented in software, firmware, hardware, or a combination of two or more thereof. The programming module 310 may be implemented in hardware (e.g., the hardware 200 of FIG. 2), and may include an operating system (OS) controlling resources related to an electronic device (e.g., the electronic device 101) and/or various applications (e.g., an application 370) executed in the OS. For example, the OS may be Android, iOS, Windows, Symbian, Tizen, Bada, and the like.

Referring to FIG. 3, the programming module 310 may include a kernel 320, a middleware 330, an API 360, and/or the application 370.

The kernel 320 (e.g., the kernel 141 in FIG. 1) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 312 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity or connection manager 348, a notification manager 349, a location manager 350, a graphic manager 351, a security manager 352, and any other suitable and/or similar manager(s).

The runtime library 335 may include, for example, a library module used by a complier, in order to add a new function by using a programming language during the execution of the application(s) 370. According to an embodiment of the present disclosure, the runtime library 335 may perform functions which are related to input and output, the management of a memory, an arithmetic function, and/or the like.

The application manager 341 may manage, for example, a life cycle of at least one of the applications 370. The window manager 342 may manage graphical user interface (GUI) resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345, as illustrated in FIG. 3, may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity or connection manager 348 may manage a wireless connectivity such as, for example, Wi-Fi and BT. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 101) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 133) is a set of API programming functions, and may be provided with a different configuration according to an OS. In the case of Android or iOS, for example, one API set may be provided to each platform. In the case of Tizen, for example, two or more API sets may be provided to each platform.

The applications 370 (e.g., the applications 134) may include, for example, a preloaded application and/or a third party application. The applications 370 (e.g., the applications 134) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application(s).

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Figure 4:
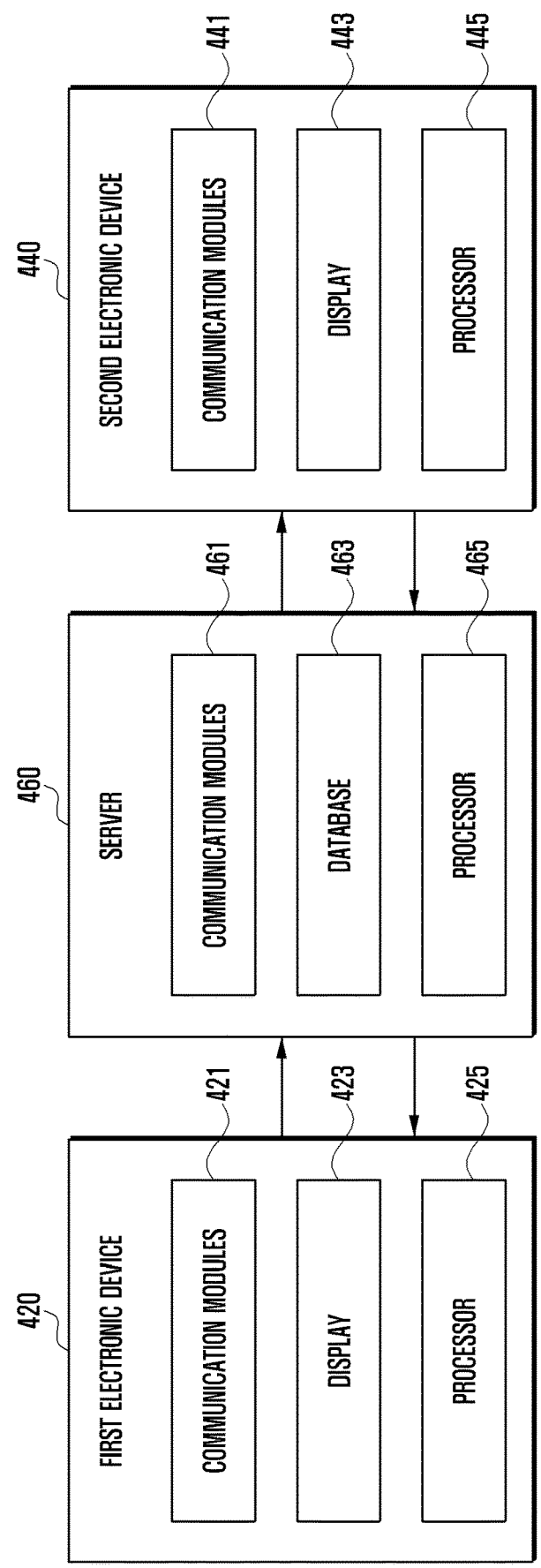
FIG. 4 illustrates a configuration of the path providing system according to various embodiments of the present disclosure.

FIG. 4 illustrates a configuration of the path providing system according to various embodiments of the present disclosure.

In various embodiments, the path providing system may include a first electronic device 420, a second electronic device 440, and a server 460.

The first electronic device 420 and the second electronic device 440 may include communication modules 421 and 441, displays 423 and 443, and processors 425 and 445, respectively.

The first electronic device 420 (the second electronic device 440) may use the communication module 421 (the communication module 441) to communicate with the server 460 or the second electronic device 440 (the first electronic device 420). For example, the first electronic device 420 (the second electronic device 440) may use the communication module 421 (the communication module 441) to transmit the server 460 a path information request or user movement information (e.g., at least one of the current location of the user, movement speed of the user during a given time, and movement path of the user). As another example, the first electronic device 420 (the second electronic device 440) may use the communication module 421 (the communication module 441) to receive movement path information from the server 460. Although not shown in FIG. 4, the movement information of the user can be obtained through the GPS module 227 or sensor module 240 included in the corresponding electronic device.

In one embodiment, the display 423 (the display 443) may display a user interface associated with various applications installed in the electronic device 420 (the electronic device 440). For example, the first electronic device 420 (the second electronic device 440) may display movement path information received from the server 460 on the display 423 (the display 443). The display 423 (the display 443) may display the movement path information in the form of a map.

The processor 425 (the processor 445) may control the overall operation of the components of the electronic device 420 (the electronic device 440), such as the communication module 421 and the display 423 (the communication module 441 and the display 443).

In various embodiments, the server 460 may include a communication module 461, a database 463, and a processor 465.

The server 460 may use the communication module 461 to communicate with the first electronic device 420 and the second electronic device 440. For example, the server 460 may use the communication module 461 to receive user movement information from the first electronic device 420 and the second electronic device 440, to receive external variable information from an external device (not shown), or to transmit movement path information to the first electronic device 420 and the second electronic device 440.

The database 463 may store various information to provide path information. For example, the server 460 can use the information stored in the database 463 to determine the means of transportation for the user of the first electronic device 420 or the second electronic device 440, or to extract the path layer.

The server 460 may use the processor 465 to determine a meeting place at which the users of the first electronic device 420 and the second electronic device 440 can meet, and to generate movement paths from the current locations of the users to the meeting place.

For example, the server 460 may receive user movement information from the first electronic device 420 and the second electronic device 440 and analyze the received movement information and variable information obtained from the outside. Thereby, the server 460 may determine the meeting place at which the users of the first electronic device 420 and the second electronic device 440 can meet and provide movement paths from the locations of the users to the meeting place.

In one embodiment, the meeting place and movement paths may be associated with allowing the users of the first electronic device 420 and the second electronic device 440 to meet each other with a minimum amount of movement. In another embodiment, the meeting place and movement paths may be associated with allowing the users to meet each other in a minimum amount of time. In another embodiment, the meeting place and movement paths may be associated with various user-friendly issues other than the minimum distance or time to travel.

In various embodiments, an electronic device may include: a communication module to communicate with an external device; a display to display a user interface; and a processor. The processor may be configured to, when a preset condition is satisfied: transmit, through the communication module to the external device, movement information of the electronic device and a request for movement path information enabling the users of the electronic device and a second electronic device to meet at a specific location;

receive, through the communication module from the external device, information regarding a meeting place determined based on the movement information of the electronic device for the users and a movement path leading to the meeting place; and display the movement path leading to the meeting place on the display.

In one embodiment, the movement information may include information regarding at least one of the current location of the electronic device, the movement speed of the electronic device during a given time, and the movement path of the electronic device.

In one embodiment, the meeting place and the movement path leading to the meeting place may be determined based on at least one of movement information of the electronic device, movement information of the second electronic device, and external variable information.

In one embodiment, the external variable information may include weather information or traffic congestion information.

In one embodiment, the meeting place and the movement path leading to the meeting place may be determined based on movement information of the electronic device, movement information of the second electronic device, and at least one external variable selected from the external variable information.

In one embodiment, the meeting place and the movement path leading to the meeting place may be determined based on a first layer corresponding to the means of transportation for the electronic device and a second layer corresponding to the means of transportation for the second electronic device.

In one embodiment, the processor may be configured to transmit the request for movement path information based on user schedule information pre-stored in the electronic device or input information received from the outside. The processor may be configured to output the movement path leading to the meeting place on the display in the form of a map.

In various embodiments, an electronic device capable of providing a movement path may include: a communication module to communicate with a first electronic device and a second electronic device; a database; and a processor. The processor may be configured to: receive, through the communication module from at least one of the first electronic device and the second electronic device, movement information and a request for movement path information between the first and second electronic devices; extract a path layer of each of the first and second electronic devices from the database based on the movement information; receive external variable information through the communication module from the outside; determine a meeting place where the users of the first and second electronic devices meet each other and a movement path leading to the meeting place for each of the first and second electronic devices on the basis of the path layers of the first and second electronic devices and the external variable information; and transmit the movement path information through the communication module to the first electronic device and the second electronic device.

In one embodiment, the movement information may include information regarding at least one of the current location of the electronic device, the movement speed of the first electronic device during a given time, and the movement path of the first electronic device. The external variable information may include weather information or traffic congestion information.

In one embodiment, the request for movement path information between the first and second electronic devices may be sent to the electronic device according to user schedule information pre-stored in the first or second electronic device or input information received by the first or second electronic device from the outside.

In one embodiment, the movement paths may be determined based on the path layers and at least one external variable selected from the external variable information.

In one embodiment, upon receiving additional variable information through the communication module from the outside, the processor may be configured to newly determine the meeting place and the movement paths leading to the meeting place by use of the path layers and the additional variable information and transmit the newly determined movement path information through the communication module to the first electronic device and the second electronic device.

In the above description, the server 106 has been depicted as an external device different from the first electronic device 102 or the second electronic device 104. However, the function of the server 106 may be performed by the first electronic device 102 or the second electronic device 104.

Figure 5:
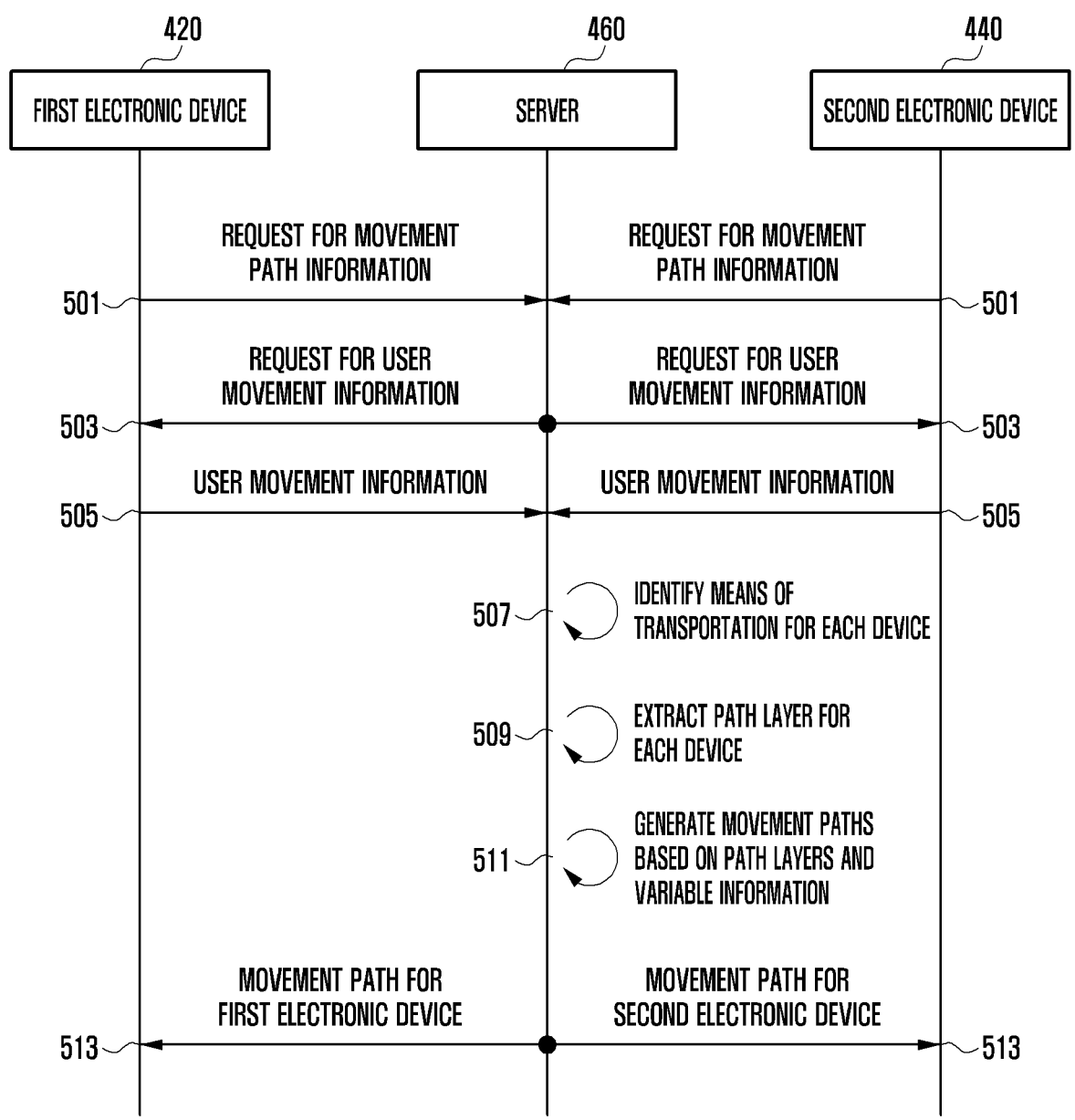
FIG. 5 and FIG. 6 are sequence diagrams for the path providing method according to various embodiments of the present disclosure.

FIG. 5 is a sequence diagrams for the path providing method according to various embodiments of the present disclosure.

In various embodiments, at operation 501, the first electronic device 420 and/or the second electronic device 440 may transmit a request for movement path information to the server 460.

The movement path information request may include information on a corresponding electronic device. For example, when the first electronic device 420 is carried by a first user who is attempting to meet with a second user, and the first user requests initiates transmission of a movement path information request to the server 460, information on the second electronic device 440 that is carried by the second user may be included in the movement path information request.

Upon reception of the request for movement path information, at operation 503, the server 460 may send a request for user movement information to the first electronic device 420 and the second electronic device 440. At operation 505, the first electronic device 420 and the second electronic device 440 may each responsive transmit respective user movement information to the server 460.

For example, the user movement information may include information regarding at least one of the current location of the electronic device, the movement speed of the electronic device at a given time, a movement path of the electronic device during a given time, and information indicating a means of transportation associated with the electronic device (e.g., ambulatory, vehicular, etc.).

At operation 507, the server 460 may identify the respective means of transportation for each electronic device based on the user movement information.

In one embodiment, the server 460 may identify the respect means of transportation for the electronic device 420 or 440 on the basis of the movement speed of the electronic device 420 or 440 during a given time. For example, if the electronic device 420 or 440 indicates movement at a speed of about 5 km for some preset duration, the server 460 may estimate that the user carrying the electronic device 420 or 440 is moving on foot based on the detected velocity. As another example, if the electronic device 420 or 440 has moved at a speed of about 15 km for a preset duration, the server 460 may estimate that the user carrying the electronic device 420 or 440 is moving by bicycle. As another example, if the electronic device 420 or 440 has moved at a speed of 40 km or more for a preset duration, the server 460 may estimate that the user carrying the electronic device 420 or 440 is moving by automobile.

In another embodiment, the server 460 may identify the means of transportation for the electronic device 420 or 440 on the basis of the movement path of the electronic device 420 or 440 during a given time. For example, if the movement path of the electronic device 420 or 440 corresponds to movement primarily along a sidewalk (or some other road or path known to be pedestrian-only), the server 460 may determine that the user carrying the electronic device 420 or 440 is moving on foot. If the movement path of the electronic device 420 or 440 corresponds to the roadway, the server 460 may estimate that the user carrying the electronic device 420 or 440 is moving by automobile. If the movement path of the electronic device 420 or 440 corresponds to the bicycle-only road, the server 460 may estimate that the user carrying the electronic device 420 or 440 is moving by bicycle. If the movement path of the electronic device 420 or 440 corresponds to both the roadway and the sidewalk, the server 460 may estimate that the user carrying the electronic device 420 or 440 is moving by bicycle or motorcycle in consideration of the movement speed of the electronic device 420 or 440 together.

At operation 509, the server 460 may identify path layers according to the means of transportation for the electronic devices 420 and 440. For example, the server 460 may identify a path layer suitable for the means of transportation depending on whether the user is carrying the electronic device 420 or 440 while moving on foot, by bicycle, or by automobile.

For example, upon determining that the user carrying the first electronic device 420 is moving on foot, the server 460 may generate a movement path for the first electronic device 420 based on a walking path layer. Upon determining that the user carrying the first electronic device 420 is moving by bicycle (e.g., or by automobile), the server 460 may generate a movement path for the first electronic device 420 based on a bicycle path layer (e.g., or by automobile path layer). Since the means of transportation for the first electronic device 420 may be different from that for the second electronic device 440, the path layers of the electronic devices 420 and 440 may be generated separately. In one embodiment, the server 460 may receive information on the means of transportation directly from the user and identify the path layer corresponding to the means of transportation.

At operation 511, the server 460 may generate the movement paths for the electronic devices 420 and 440 based on the path layers identified at operation 509 and variable information.

The variable information may be stored in advance in the database 463 or may be received from the outside via the communication module 461. For example, the server 460 may receive variable information related to path generation from yet another external device. For example, the variable information may include information regarding at least one of traffic congestion in the area related to the path layer, presence of a dangerous geographical object, whether the meeting place is close to a landmark, the location of the final destination for the electronic device 420 or 440, and the weather thereof.

The server 460 may generate movement paths for the users based on the path layer of the first electronic device 420, the path layer of the second electronic device 440, and the variable information at operation 511. Here, the movement path may mean the movement path with the shortest distance or time depending on the user's selection, and may also mean various other paths in consideration of the user convenience. For example, the shortest path may be the generated movement path for the user traveling on foot in snowy or rainy weather. When the first user of the first electronic device 420 and the second user of the second electronic device 440 meet at a meeting place and then move together to the final destination, the generated movement path should be determined in consideration of the movement path from the meeting place to the final destination.

In one embodiment, the server 460 may compare the path layers of the electronic devices 420 and 440 to identify the meeting place and compute the expected arrival times at the meeting place based on the means of transportation for the electronic devices 420 and 440. The variable information may be used to estimate the expected arrival time. For example, if a traffic congestion section is included in the movement path, the expected arrival time may be greater than the average time computed based on the means of transportation. As another example, if there is a time restriction on the movement path (e.g., travel time limit for public transportation, or temporary closure of the road), the server 460 may estimate the expected arrival time in consideration of the time restriction.

The server 460 may compare the expected arrival times of the electronic devices 420 and 440 to generate movement paths. For example, the server 460 may consider, as the movement paths, movement paths that produce the earliest expected arrival times for the first electronic device 420 and the second electronic device 440 while the different between the expected arrival times is small.

As another example, the server 460 may determine, as the movement path, a movement path that improves the travel path of the user of the first electronic device 420 or the second electronic device 440 (shortest distance or minimum time) in consideration of the weather information.

For example, if the user of the first electronic device 420 moves on foot in snowy or rainy weather and the user of the second electronic device 440 moves by automobile or is located in an area where public transportation is readily available, the server 460 may determine a movement path that improves the travel time of the user of the first electronic device 460 as the movement path.

At operation 513, the server 460 may transmit the generated movement path information generated at operation 511 to the first electronic device 420 and the second electronic device 440.

For example, the server 460 may transmit all the information about the movement paths to the electronic devices 420 and 440. The server 460 may transmit the first electronic device 420 the movement path information from the current location of the first electronic device 420, and transmit the second electronic device 440 the movement path information from the current location of the second electronic device 440.

In one embodiment, one user may check the expected movement path and current position of the counterpart user while being guided by the proposed movement path leading to the meeting place.

The server 460 may transmit map information showing the movement paths to the electronic devices 420 and 440. The map information may include, for example, the times estimated by the electronic devices 420 and 440 for arrival at the meeting place.

Although not shown in FIG. 5, when the proposed movement path information is changed according to occurrence of new variable information after operation 513, the server 460 may newly generate movement paths and transmit the new movement path information to the first electronic device 420 and the second electronic device 440.

Figure 6:
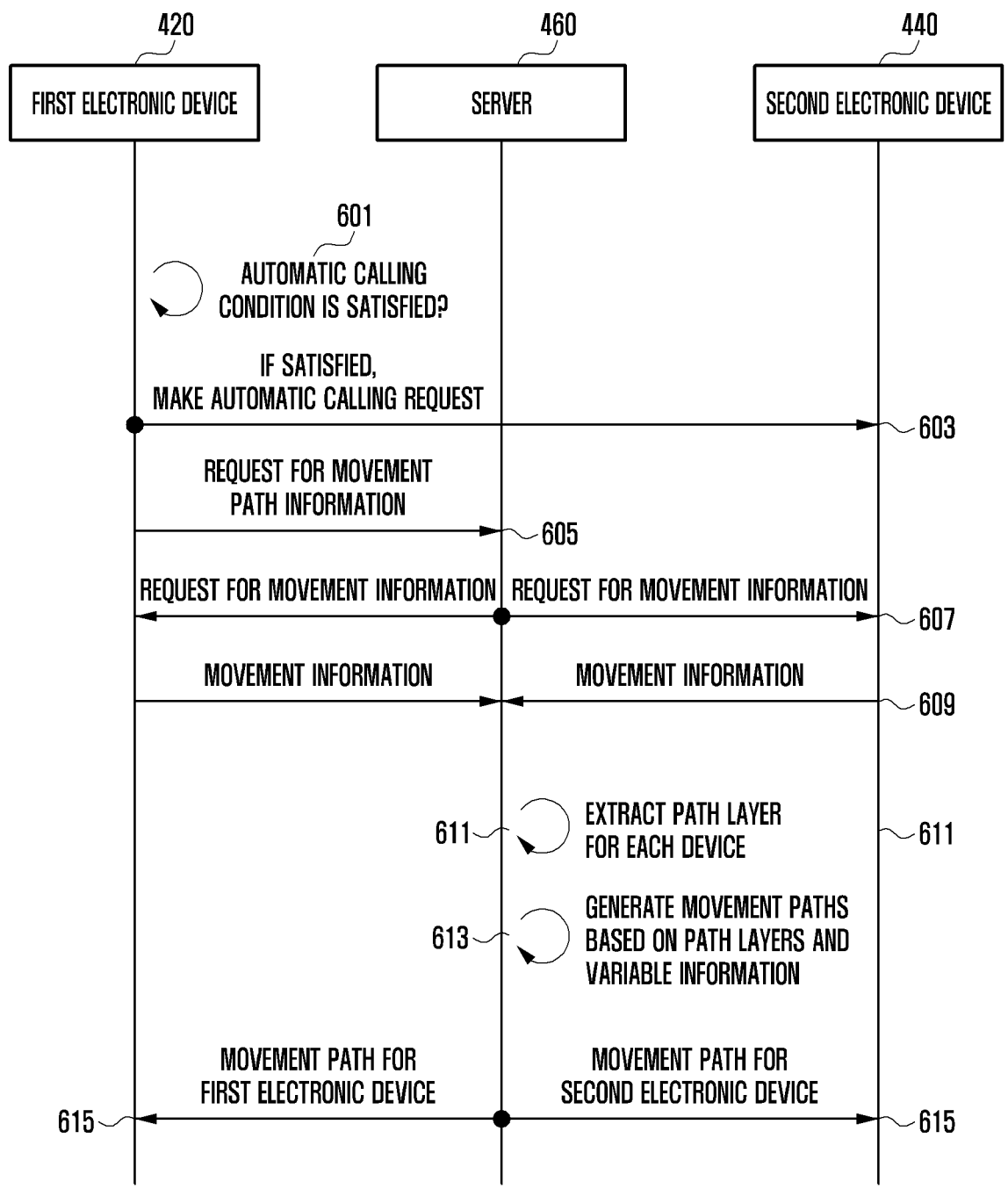

FIG. 6 is a sequence diagram for the path providing method according to various embodiments of the present disclosure.

In one embodiment, the user of the first electronic device 420 may move on foot or by using public transportation, and the second electronic device 440 may be attached to an autonomous vehicle or a call taxi for movement.

At operation 601, the first electronic device 420 may determine whether to invoke the transportation vehicle associated with the second electronic device 440. For example, when a preset automatic calling condition is satisfied, the first electronic device 420 may prompt the user to indicate whether to make an automatic invocation.

The first electronic device 420 may determine whether the automatic calling condition is satisfied according to a preset criterion. For example, according to schedule information managed by a scheduling application, when the completion time of a given task is reached or the start time of the next task is reached, the first electronic device 420 may determine that the automatic calling condition is satisfied and prompt the user to indicate whether to make an automatic invocation.

As another example, after the user enters a store, when a payment authorization message is received, the first electronic device 420 may determine that the automatic calling condition is satisfied and prompt the user to indicate whether to make an automatic invocation.

The first electronic device 420 may output a pop-up window for determining whether to make an automatic invocation on the display 423 to determine whether to actually transmit an automatic calling request.

Depending on the input of the user, at operation 603, the first electronic device 420 may send an automatic calling request to the second electronic device 440. At operation 605, the first electronic device 420 may transmit a request for movement path information to the server 460.

At operation 607, the server 460 may transmit a request for user movement information to the first electronic device 420 and the second electronic device 440. The user movement information may include information regarding at least one of the current location of the electronic device 420 or 440, a movement speed of the electronic device 420 or 440 during a given time, a movement path of the electronic device 420 or 440 during a given time, and a means of transportation associated with the electronic device 420 or 440.

At operation 609, the first electronic device 420 and the second electronic device 440 may each transmit respective user movement information to the server 460.

At operation 611, the server 460 may identify the means of transportation for each electronic device 420 or 440 based on the user movement information.

In one embodiment, the server 460 may identify the path layer based on the means of transportation. For example, the server 460 may determine that the path layer of the first electronic device 420 corresponds to walking or public transportation, and determine that the path layer of the second electronic device 440 corresponds to an automobile.

At operation 613, the server 460 may generate the movement paths based on the path layers and the variable information.

The variable information may be stored in advance in the database 463 or may be received from the outside via the communication module 461. For example, the server 460 may receive variable information related to path generation from the outside. For example, the variable information may include information regarding at least one of traffic congestion in the area related to the path layer, presence of a dangerous geographical object, whether the meeting place is close to a landmark, the location of the final destination for the electronic device 420 or 440, and the weather thereof.

The server 460 may generate movement paths for the users based on the path layers and the variable information. Here, the movement path may mean the movement path with the shortest distance or time depending on the user's selection, and may also mean various other paths in consideration of the user convenience.

For example, the shortest path may be generated as the movement path for the user traveling on foot or using public transportation in snowy or rainy weather. The generated movement path may be a movement path designed to pass through a meeting place close to the landmark so that the user can easily recognize the meeting place. As another example, although the user of the first electronic device 420 moves on foot and the second electronic device 440 is moved by an automobile, if the speed of the automobile is significantly lowered due to traffic congestion, the generated movement path may refer to a movement path designed to increase the walking distance of the user of the first electronic device 420 or designed to avoid the traffic congestion section.

At operation 615, the server 460 may transmit the movement path information generated at operation 613 to the first electronic device 420 and the second electronic device 440.

For example, the server 460 may transmit all the information about the movement paths to the electronic devices 420 and 440. The server 460 may transmit the first electronic device 420 the movement path information from the current location of the first electronic device 420, and transmit the second electronic device 440 the movement path information from the current location of the second electronic device 440.

In one embodiment, one user may view the expected movement path and current position of the counterpart electronic device while receiving guidance of the proposed movement path leading to the meeting place.

The server 460 may transmit map information showing the movement paths to the electronic devices 420 and 440. The map information may include, for example, the times estimated the electronic devices 420 and 440 for arrival at the meeting place.

Although not shown in FIG. 6, the proposed movement path information may be changed according to occurrence and reception of new variable information after operation 615, in which the server 460 may generate new movement paths and transmit the new movement path information to the first electronic device 420 and the second electronic device 440.

FIGS. 7A to 7D are maps showing movement paths of the electronic devices 420 and 440 according to various embodiments of the present disclosure.

In various embodiments, the server 460 may provide a movement path suitable for user convenience based on various variable information.

Figure 7A:
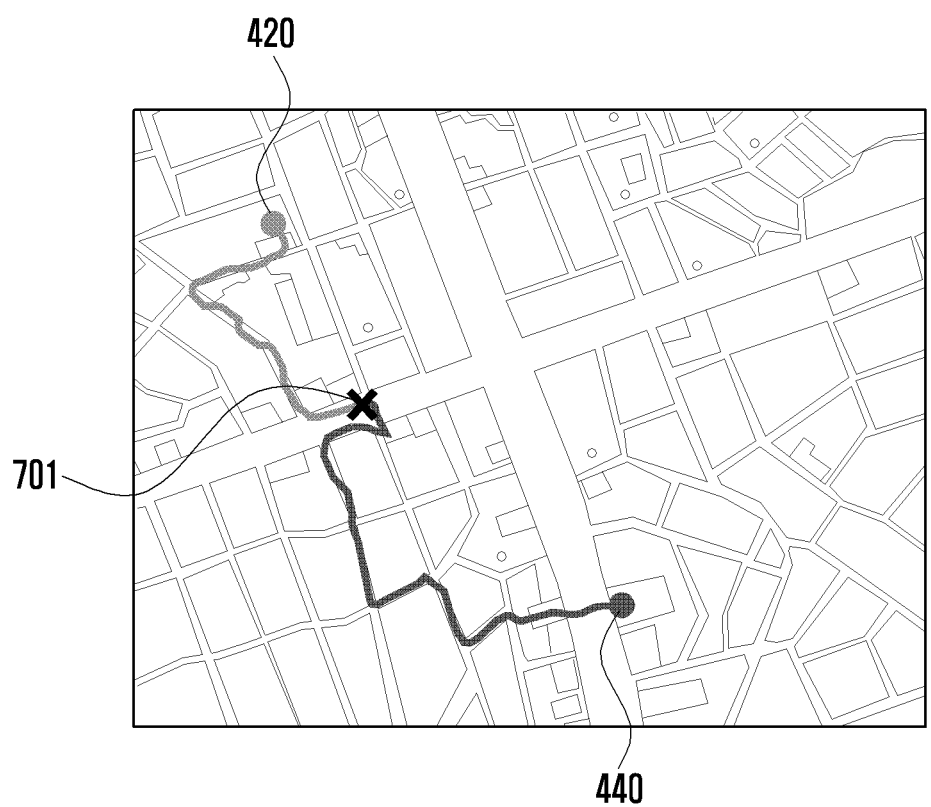
FIG. 7A, FIG. 7B, FIG. 7C and FIG. 7D are maps showing movement paths of electronic devices according to various embodiments of the present disclosure.
Figure 7B:
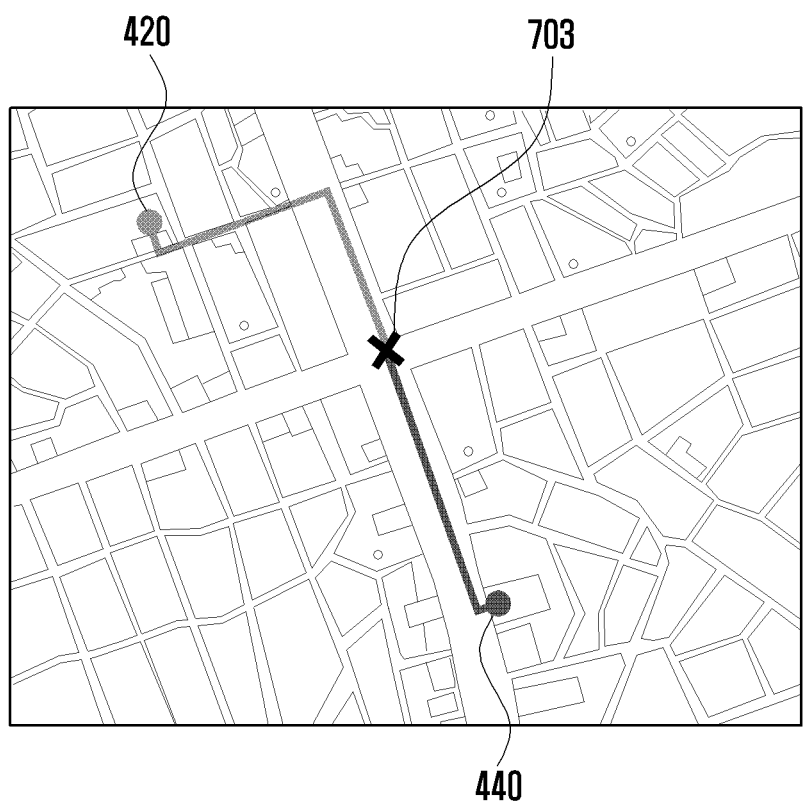

Upon determining that the users of the first electronic device 420 and the second electronic device 440 are both traveling on foot, as shown in FIG. 7A, the server 460 may set the meeting place 701 at the midpoint between a current position of the first electronic device 420 and a current position of the second electronic device 440, and determine a movement path that includes shortest paths from the positions of the first and second electronic devices 420 and 440 to the meeting place 701 as the proposed movement path.

It is noted that other paths may be generated as well. For example, although the users of the first electronic device 420 and the second electronic device 440 start at the same positions as those of FIG. 7A, the server 460 may provide one or more movement paths different from that shown in FIG. 7A. For example, if the user desires to travel along a relatively safer path as opposed to, for example, an isolated alleyway, the server 460 may set a path such as that shown in FIG. 7B as the proposed movement path based on the selected variable information, and meeting at point 703.

Figure 7C:
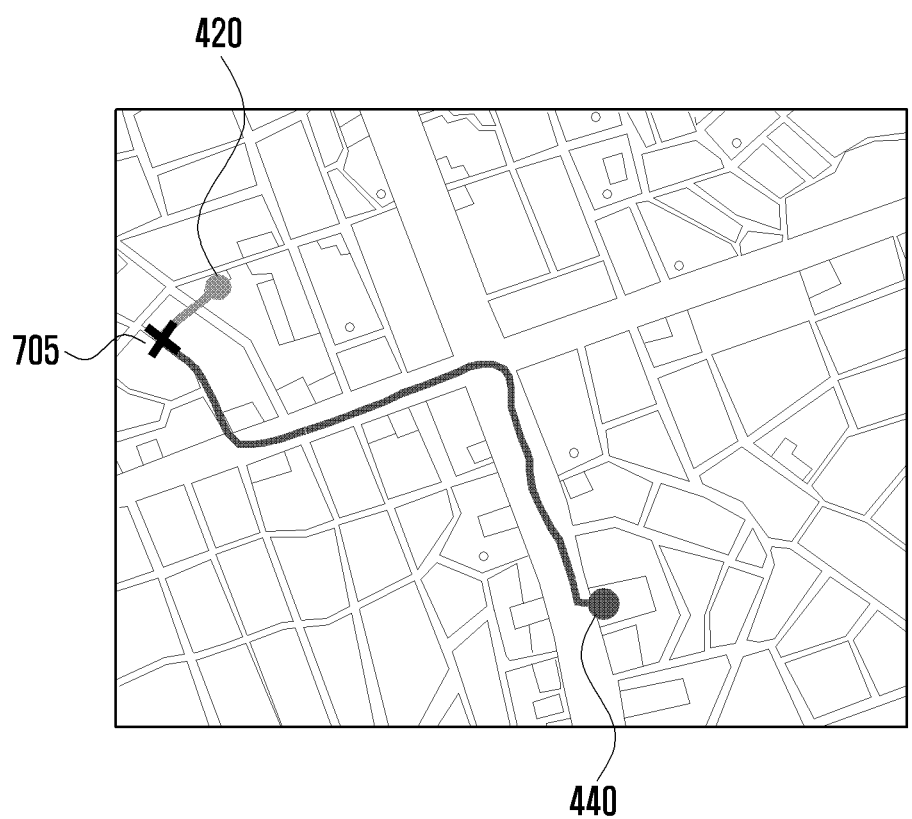
Figure 7D:
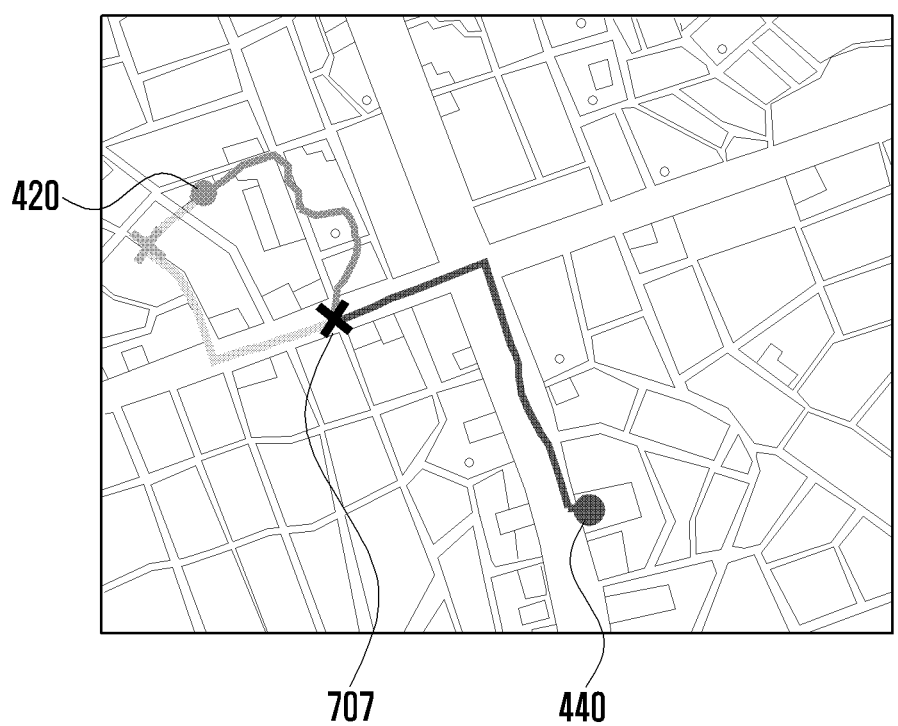

When the user of the first electronic device 420 travels on foot and the second electronic device 440 travels by automobile or motorcycle, the server 460 may determine the meeting place 705 so that the travel path of the user of the first electronic device 420 is lessened and provide the corresponding movement path as shown in FIG. 7C. In addition, when a traffic congestion zone or a dangerous zone is included in the movement path shown in FIG. 7C, the server 460 may determine the movement path shown in FIG. 7D as the movement path according to the variable information selected by the user although the walking distance is increased, resulting in a meeting at point 707.

In one embodiment, the map showing the movement path reflecting the variable information selected by the user (FIG. 7D) may also show the movement path not reflecting the variable information (FIG. 7C) in a shaded form.

In various embodiments, the user may select a desired variable to be reflected in movement path generation from the variable information. Hence, it is possible to provide the user with movement paths suitable for various situations.

Figure 8:
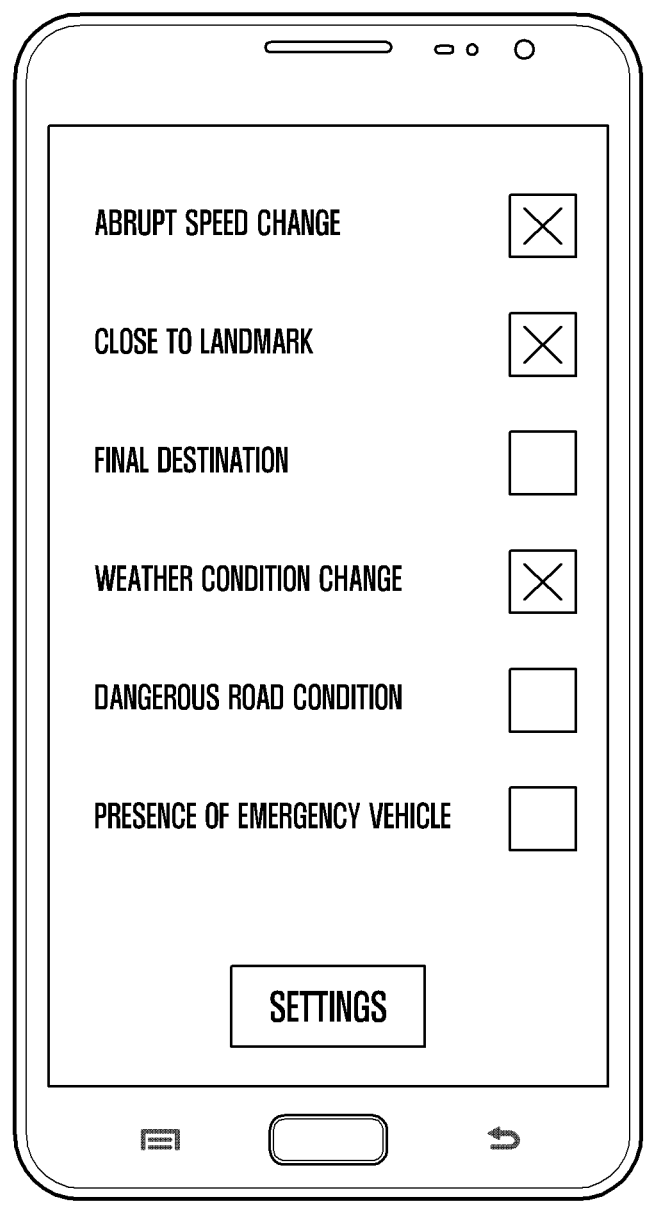
FIG. 8 is a screen representation for setting variable information according to an embodiment of the present disclosure.

FIG. 8 is a screen representation for setting variable information according to an embodiment of the present disclosure.

In various embodiments, the user may select the variable information to be reflected in the proposed movement path to be generated.

In one embodiment, the user may seek to move to the meeting place and then move to another place. For example, if the user of the first electronic device 420 meets the user of the second electronic device 440 at the meeting place, and then wishes to move to a final destination, the user of the first electronic device 420 may set the location of the final destination as a variable to be reflected in movement path generation. As another example, if the user desires the meeting place to be close to a landmark, the user may set the location of the meeting place as one instance of the variable information. As another example, if the user driving an automobile does not want to use weather condition as a portion of the variable information, the weather condition may be excluded from the variable information according to user settings. These options may be selected by a user interface menu, as seen in FIG. 8.

In various embodiments, the electronic device 420 or 440 may transmit information about the variable information selected by the user to the server 460 so that the user selection is reflected in generation of the movement path.

Figure 9A:
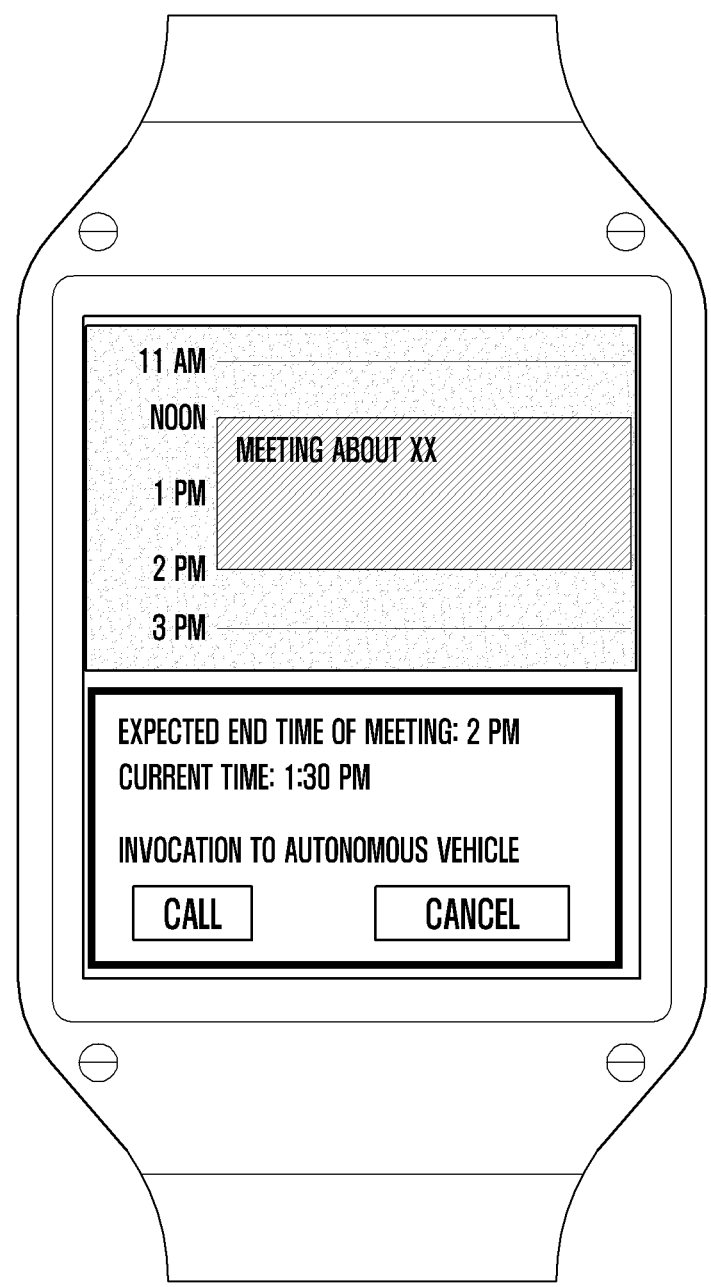
FIG. 9A and FIG. 9B illustrate a user interface for an automatic call in the electronic device according to various embodiments of the present disclosure.
Figure 9B:
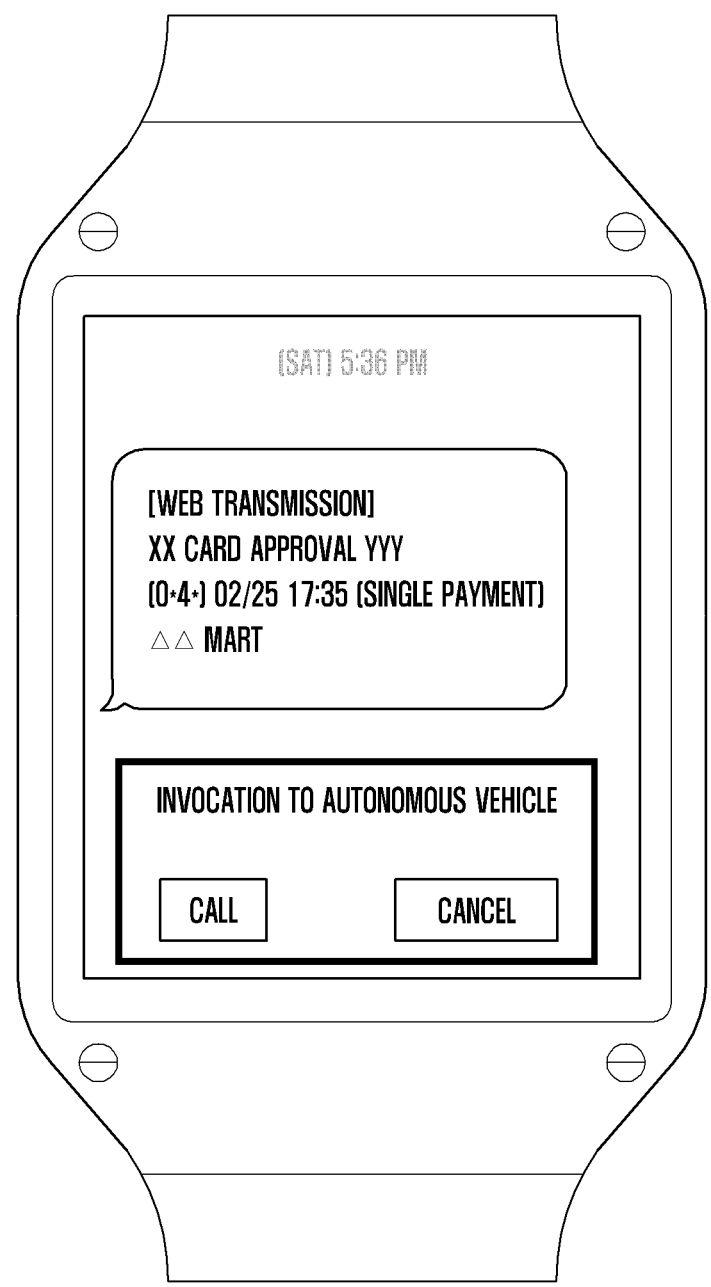

FIGS. 9A and 9B illustrate a user interface for an automatic call in the electronic device 420 according to various embodiments of the present disclosure.

In various embodiments, when a preset condition is satisfied, the electronic device 420 may prompt the user to indicate whether to make an automatic invocation (e.g., a call or transmitted request) to a designated self-driving car (or call taxi). Depending on the response of the user, the electronic device 420 may transmit an automatic calling signal to the self-driving car or call taxi and send a request for movement path information to the server 460.

In various embodiments, the electronic device 420 may be a wearable device that can be worn on the body of the user. For example, the electronic device 420 may be a smart glass, a smart watch or wristband, a contact lens type device, a ring type device, a shoe type device, a clothes type device, a globe type device, or a head-mounted display, which can be detachably attached to a portion of the human body or clothes.

In one embodiment, as shown in FIG. 9A, the electronic device 420 may display, on the display 423, a popup window prompting the user to indicate whether to make an automatic invocation on the basis of the schedule information and time managed by an installed scheduling application. For example, if a meeting is scheduled between 12 PM and 2 PM, the electronic device 420 may display a popup window prompting the user to indicate whether to transmit an automatic call to an autonomous vehicle (or call taxi) at 1:30 PM. The user can transmit an automatic calling signal to a designated autonomous vehicle (or call taxi) by selecting (e.g., clicking) the call button on the popup window.

In another embodiment, as shown in FIG. 9B, after the user enters a store, when payment information is received, the electronic device 420 may determine that the automatic calling condition is satisfied and output a popup window prompting the user to indicate whether to make an automatic invocation. For example, when the electronic device 420 receives a message indicating that the payment has been approved after the user has completed purchase of goods at the store, it may expect that the user will leave the store after some duration, based on the payment time and payment details indicated by the payment approval message. Immediately upon reception of the payment approval message, the electronic device 420 may display a popup window prompting the user to indicate whether to make an automatic call to an autonomous vehicle (or call taxi). The user can initiate transmission of an automatic calling signal to a designated autonomous vehicle (or call taxi) by selection of the call button on the popup window.

Although not shown, the electronic device 420 may determine that the automatic calling condition is satisfied in various situations. For example, when the user confirms completion of the exercise after entering a fitness center, the electronic device 420 may determine that the automatic calling condition is satisfied and display a popup window requesting the user to decide whether to make an automatic call to an autonomous vehicle (or call taxi). As another example, if the user enters a performance viewing plan in advance, the electronic device 420 may determine that the automatic calling condition is met when the end time of the performance is reached. As another example, if the user periodically enters and leaves a certain place (e.g., commuting), the electronic device 420 may identify the behavioral pattern of the user and determine that the automatic calling condition is met when the user leaves the place.

In one embodiment, the popup window requesting the user to decide whether to make an automatic call to an autonomous vehicle (or call taxi) may be output on the display of a wearable device worn by the user. Here, the wearable device may be the electronic device 420 according to various embodiments of the present disclosure, and may also be a separate external device that displays a screen in cooperation with the electronic device 420.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific IC (ASIC) chip, a field-programmable gate array (FPGA), and a programmable-logic device for performing certain operations which have been known or are to be developed in the future.

Examples of computer-readable media include: magnetic media, such as hard disks, floppy disks, and magnetic tape; optical media such as compact disc ROM (CD-ROM) and DVD; magneto-optical media, such as floptical disks; and hardware devices that are specially configured to store and perform program instructions (e.g., programming modules), such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules in order to perform the operations and methods described above, or vice versa.

Modules or programming modules according to the embodiments of the present disclosure may include one or more components, remove part of them described above, or include new components. The operations performed by modules, programming modules, or the other components, according to the present disclosure, may be executed in serial, parallel, repetitive or heuristic fashion. Part of the operations can be executed in any other order, skipped, or executed with additional operations.

A method for adjusting a camera exposure in an electronic device according to various embodiments of the present disclosure can identify an exposure state of a partial area selected by a user from the whole area of a preview image, and provide a screen for adjusting an exposure correctly based on the identification result of the exposure state.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
a transceiver to communicate with an external device;
a display to display a user interface; and
a processor, configured to:
identify, while moving the electronic device, movement information including a current location of the electronic device, a movement speed of the electronic device and a movement path of the electronic device;
when a preset condition is satisfied, transmit the movement information of the electronic device and request a meeting path navigable to a meeting location with a second electronic device to the external device;
receive meeting path information from the external device, the meeting path information including a meeting location and a meeting movement path designated based on the movement speed of the electronic device, the movement path of the electronic device, a movement speed of the second electronic device, and a movement path of the second electronic device;
display the meeting movement path navigable to the meeting location between the electronic device and the second electronic device on the display; and
update, when altering the meeting path information by the external device, the meeting location and the meeting movement path on the display.

2. The electronic device of claim 1, wherein the meeting location and the meeting movement path are further determined based on external variable information, and at least one variable selected from the external variable information.

3. Electronic device of claim 2, wherein the external variable information includes at least one of weather information and traffic congestion information.

4. The electronic device of claim 1, wherein the meeting location and the meeting movement path are determined based on a first layer corresponding to a type of transportation associated with the electronic device and a second layer corresponding to a type of transportation associated with the second electronic device.

5. The electronic device of claim 1, wherein the request for the meeting path information is transmitted based on at least one of: user schedule information pre-stored in the electronic device, and input information received from an external device providing the input information.

6. The electronic device of claim 1, wherein the processor is configured to display a map including a representation of the movement path navigable to the meeting location on the display.

7. An electronic device capable of providing a movement path, comprising:
a transceiver to communicate with a first electronic device and a second electronic device;
a database; and
a processor, wherein the processor is configured to:
receive a request for meeting path information from at least one of the first and second electronic devices, and movement information transmitted from the first electronic device and the second electronic device, wherein the movement information includes a current location of the electronic device, a movement speed of the electronic device and a movement path of the electronic device;
extract path layers for the first and second electronic devices from the database based on the movement information of the first electronic device and on the movement information of the second electronic device;
receive external variable information from an external server;
determine a meeting location and two meeting movement paths navigable by the first and second electronic devices respectively to arrive at the meeting location, on a basis of the path layers of the first and second electronic devices and the external variable information; and
transmit information on the two meeting movement paths through the transceiver to the first electronic device and the second electronic device, respectively.

8. The electronic device of claim 7, wherein the external variable information includes at least one of weather information and traffic congestion information.

9. The electronic device of claim 7, wherein the request for the meeting path information is transmitted based on at least one of: user schedule information pre-stored in the electronic device, and input information received from an external server providing the input information.

10. The electronic device of claim 7, wherein the movement path is determined based on the path layers and at least one external variable selected from the external variable information.

11. The electronic device of claim 7, wherein the processor is further configured to:
upon receiving additional variable information through the transceiver from the external server, redetect the meeting location and the movement paths navigable to the meeting location using the path layers and the additional variable information, and transmit the redetected movement paths through the transceiver to the first electronic device and the second electronic device respectively.

12. A method for providing a movement path in an electronic device, the method comprising:
receiving a request for meeting path information from at least one of a first and second electronic devices, and
receiving movement information transmitted from the first electronic device and the second electronic device, wherein the movement information includes a current location of the electronic device, a movement speed of the electronic device and a movement path of the electronic device;
extracting path layers of the first and second electronic devices based on the movement information of the first electronic device and on the movement information of the second electronic device
receiving external variable information from an external server;
determining a meeting location and two meeting movement paths navigable to the meeting location based on the path layers and the external variable information; and
transmitting the two meeting movement paths to the first electronic device and the second electronic device respectively.

13. The method of claim 12, wherein the external variable information includes at least one of weather information and traffic congestion information.

14. The method of claim 12, wherein the request for movement path information is transmitted according to at least one of user schedule information pre-stored in the first or second electronic device and input information received by the first or second electronic device from the external server.

15. The method of claim 12, wherein the movement path is determined based on the path layers and at least one external variable selected from the external variable information.

16. The method of claim 12, further comprising:
when receiving additional variable information from the outside, redetecting the meeting location and the movement paths navigable to the meeting location using of the path layers and the additional variable information; and
transmitting the redetected movement paths to the first electronic device and the second electronic device respectively.

* * * * *